United States Patent
Riedel

(10) Patent No.: US 7,859,321 B2
(45) Date of Patent: Dec. 28, 2010

(54) MONITORING THE TEMPERATURE DEPENDENCE OF THE EXTERNAL CAPACITORS OF A CHARGE PUMP AND IMPROVED CHARGE PUMPS BASED THEREON

(75) Inventor: Friedbert Riedel, Zug (CH)

(73) Assignee: NXP B.V., Eindhoven (NL)

( * ) Notice: Subject to any disclaimer, the term of this patent is extended or adjusted under 35 U.S.C. 154(b) by 179 days.

(21) Appl. No.: 11/813,284

(22) PCT Filed: Dec. 22, 2005

(86) PCT No.: PCT/IB2005/054379
§ 371 (c)(1),
(2), (4) Date: Aug. 8, 2008

(87) PCT Pub. No.: WO2006/070324
PCT Pub. Date: Jul. 6, 2006

(65) Prior Publication Data
US 2008/0297231 A1    Dec. 4, 2008

(30) Foreign Application Priority Data
Dec. 30, 2004    (EP)    ................... 04107058

(51) Int. Cl.
*G05F 1/10*    (2006.01)
(52) U.S. Cl. ............................. 327/536; 363/59; 363/60
(58) Field of Classification Search ................. 327/536; 363/59–60
See application file for complete search history.

(56) References Cited

U.S. PATENT DOCUMENTS

| | | | |
|---|---|---|---|
| 6,356,062 B1 | 3/2002 | Elmhurst et al. | |
| 6,812,787 B2 * | 11/2004 | Kimura | 330/69 |
| 7,253,676 B2 * | 8/2007 | Fukuda et al. | 327/536 |
| 7,532,529 B2 * | 5/2009 | Dadashev et al. | 365/207 |
| 2008/0278981 A1 * | 11/2008 | Hachiya | 363/74 |

FOREIGN PATENT DOCUMENTS

| | | |
|---|---|---|
| EP | 0834981 A2 | 4/1998 |
| JP | 2002252970 A * | 9/2002 |

OTHER PUBLICATIONS

Wang, C-C; et al "Efficiency Improvement in Charge Pump Circuits" IEEE Journal of Solid State Circuits, vol. 32, No. 6, Jun. 1997, pp. 852-860.

* cited by examiner

*Primary Examiner*—Lincoln Donovan
*Assistant Examiner*—Shikha Goyal

(57) ABSTRACT

Apparatus (40) comprising a multistage charge pump (10) having an output (41) for connecting a load ($C_{out}$, $K_L$). The charge pump (10) comprises m gain stages for charging and discharging m external stage capacitors (C) in order to provide an output voltage ($V_{out}$) at the output (41) that is about m times higher than a supply voltage ($V_{dd}$) of the charge pump (10). The charging and discharging is influenced by switches inside said charge pump (10) that are controlled by a switching signal having a switching frequency ($f_{osc}$). A monitoring circuit (20) is provided that monitors temperature-induced changes of the value of an external reference capacitor ($C_{ref}$). Furthermore, means (30) for adjusting the switching frequency ($f_{osc}$) are employed in order to compensate variations of the gain of said charge pump (10) that are caused by the changes of the value of the m external stage capacitors (C).

8 Claims, 4 Drawing Sheets

MONITORING THE TEMPERATURE DEPENDENCE OF THE EXTERNAL CAPACITORS OF A CHARGE PUMP AND IMPROVED CHARGE PUMPS BASED THEREON

The present invention concerns an apparatus comprising a charge pump with external capacitors.

In many integrated circuits, a charge pump is required. A charge pump is typically employed in order to provide an output voltage that is approximately m times higher than the supply voltage (with m=2, 3, 4, ... ).

State of the art are fully integrated versions of multistage Dickson charge pumps that multiply approximately the supply voltage ($V_{dd}$) by a factor of m, if m stage capacitors (C) are employed. The external stage capacitors C are needed in order to be able to obtain high power efficiency in the range of about 95%, for instance. It is a disadvantage when using external capacitors that they show temperature dependence. Not only does the value of the capacitor change with temperature, but also the capacitor's DC leak current is influenced by the temperature. For high-quality capacitors the value changes ±10% over a temperature range from −55° C. to +85° C. For low-cost capacitors the temperature dependence is typically higher. This leads to a gain reduction of the Dickson charge pump for lower temperatures, which in turn reduces the power efficiency of the charge pump.

In many applications, voltages higher than the power supplies are frequently required. The increased voltage level is obtained in a charge pump, as described above, as a result of transferring charges to an external capacitor serving as a capacitive load. Charge pumps usually operate at a high frequency level in order to increase their output power within a reasonable size of total capacitance used for the charge transfer. This operating frequency may be adjusted by compensating for changes in the power requirements and saving the energy delivered to the charge pump.

Among many approaches to the charge pump design, the switched-capacitor circuits, such as the principle of a Dickson charge pump mentioned above, are very popular, because they can be implemented on the same chip together with other components of an integrated system. In FIG. 1 an example of a conventional Dickson charge pump 10 is illustrated.

The Dickson charge pump, if MOS transistors are used as switches instead of the diodes $D_1$-$D_m$ (cf. FIG. 1), operates by switching these MOSFET switches on and off, which charge and discharge a number of external (stage) capacitors C transferring energy to an output load. The gain $\Delta V$ per stage can be expressed as follows:

$$\Delta V = \left(\frac{C}{C+C_S}\right)V_{dd} - \frac{I_{out}}{(C+C_S)\cdot f_{osc}}$$

This leads for an m-stage charge pump to an output voltage $V_{out}$, as expressed by the following equation:

$$V_{out}=V_{in}+m\cdot\Delta V,$$

if a precharged value $V_{in}$ on the output load, as represented by $C_{out}$ and $R_L$ is given.

If the stage capacitors C are external devices, then the temperature dependence C=f(T) can be very high. This means for instance that for lower temperatures the value of C may be only half the value at room temperature. This in turn means that with the same load current conditions ($I_{out}$) the gain $\Delta V$ will be reduced. This is not acceptable for many applications.

There is a focus on different issues related to practical implementation of the charge pump, starting from its topological properties, voltage gain, and dynamic properties to improvements in efficiency and power considerations. One important issue to be considered is the temperature dependence mentioned above, if external capacitors are employed. So far no satisfying solutions have been proposed to deal with the temperature-induced variations of the value of these external capacitors.

Conventional charge pump circuits use a fixed switching frequency that leads to power efficiency degradation for loading less than the rated loading. Design efforts are presented in a paper by C-C. Wang et al., "Efficiency improvement in charge pump circuits", IEEE Journal of Solid State Circuits, vol. 32, no. 6, pp. 852-860, June 1997. According to this paper, a special circuit organization is proposed to regulate the switching frequency of the charge pump whenever a requirement for the load current changes. This paper, however, does not deal with temperature-induced effects.

In view of the above, it is thus an object of the present invention to provide a charge pump with improved temperature stability.

It is a further object of the present invention to provide an apparatus that can be used in connection with a charge pump to allow temperature-induced effects to be compensated.

These disadvantages of known systems, as described above, are reduced or removed with the invention as described and claimed herein.

An apparatus in accordance with the present invention is claimed in claim 1. Various advantageous embodiments are claimed in claims 2 through 8.

The invention is based on the recognition that a temperature-induced reduction of the value of an external stage capacitor can be compensated by increasing the switching frequency of the charge pump. Therefore, the gain $\Delta V$ can be seen again as nearly constant.

According to the present invention, an apparatus is provided that comprises a monitoring circuit with an external reference capacitor. The monitoring circuit is designed for use in connection with a multistage charge pump having m external stage capacitors and the external reference capacitor has the same value as the external stage capacitors of the multistage charge pump. This multistage charge pump comprises a plurality of gain stages—hence the name multistage charge pump—for charging and discharging the external stage capacitors in order to provide a desired output voltage at the output. The desired output voltage is higher than a supply voltage of the charge pump. The charging and discharging is influenced by switches inside said charge pump. These switches are controlled by a switching signal having a certain switching frequency. The above-mentioned monitoring circuit is provided in order to be able to monitor temperature-induced changes of the value of said external reference capacitor. Furthermore, means for adjusting the switching frequency are employed in order to compensate variations of the gain of said charge pump that are caused by the changes of the value of said m external capacitors.

Additional features and advantages of the invention will be set forth in the description that follows, and in part will be apparent from the description.

For a more complete description of the present invention and for further objects and advantages thereof, reference is made to the following description, taken in conjunction with the accompanying drawings, in which.

As mentioned above, the gain $\Delta V$ per stage of a Dickson charge pump 10 can be expressed as follows:

$$\Delta V = \left(\frac{C}{C+C_S}\right)V_{dd} - \frac{I_{out}}{(C+C_S) \cdot f_{osc}} \quad (1)$$

If the value of the capacitance C goes down when the temperature is falling, the gain $\Delta V$ will be reduced since the second term in the above equation (1) gets larger. This is not acceptable for many applications. A compensation of this temperature-induced reduction of the gain can be achieved if one at the same time increases the switching frequency $f_{osc}$. An increased switching frequency $f_{osc}$ allows the reduced value of the capacitor C to be compensated. Note that for completeness a stray capacitance, $C_S$, is included in the above equation (1).

In order to be able to provide for an active compensation of the effect described above, one needs to be in a position to monitor the actual capacitance of the external stage capacitors C. According to the present invention a monitoring circuit is proposed which monitors the temperature dependence of one or more of the m external stage capacitors C. This is possible since the voltage dependence of the capacitors can be neglected.

Figure 1:
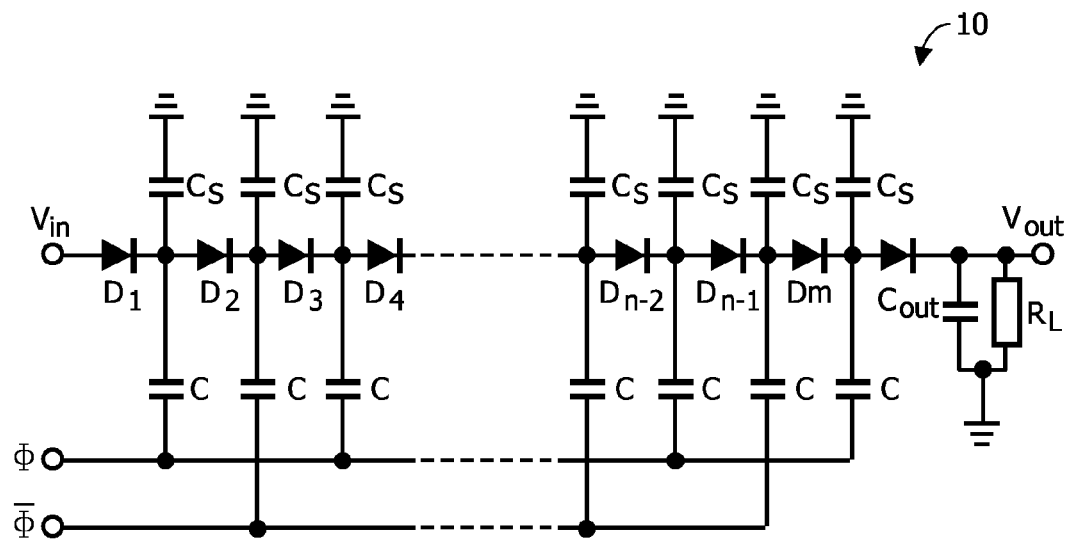
FIG. 1 shows a schematic block diagram of a conventional Dickson charge pump.
Figure 2A:
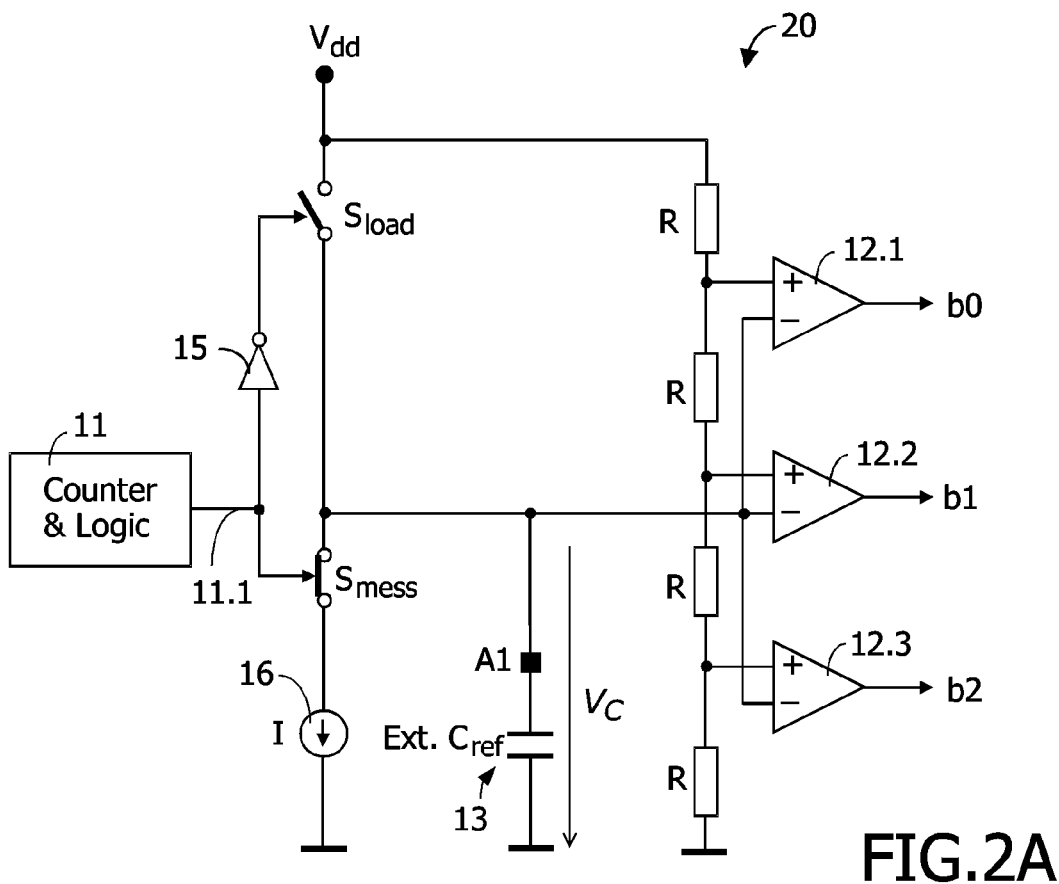
FIG. 2A shows a schematic block diagram of a first part of an embodiment of the present invention.
Figure 2B:
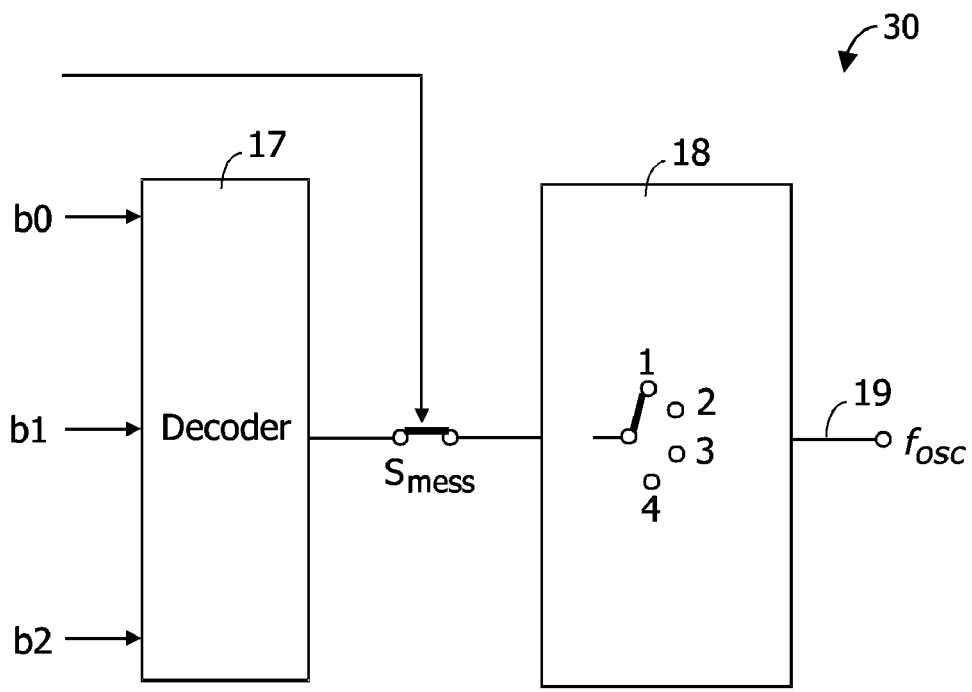
FIG. 2B shows a schematic block diagram of another part of the embodiment in FIG. 2A.

A first embodiment of such a monitoring circuit 20, according to the present invention, is illustrated in FIG. 2A. As illustrated in FIG. 2A, the monitoring circuit 20 comprises a counter & logic block 11. There are two switches $S_{load}$ and $S_{mess}$. The counter & logic block 11 issues a switching signal at the output 11.1. This signal is applied to the switch $S_{mess}$ to close this switch. There is an inverter 15 that inverts the switching signal to make sure that the switch $S_{load}$ opens when the switch $S_{mess}$ is closed, and vice versa. There is a bank of several comparators 12.1 through 12.3 which at their input side are connected to an external reference capacitor 13 (C). This external reference capacitor 13 ($C_{ref}$) has the same value as the stage capacitors C of a multistage charge pump. There are several identical resistors R situated between the supply voltage $V_{dd}$ and ground. These resistors R serve as voltage dividers that divide the supply voltage with equal voltages. The special arrangement of the resistors R is referred to as resistor ladder. The actual voltage $V_C$ across the external reference capacitor 13 ($C_{ref}$) is compared with the different voltages across the resistors R. That is, the three comparators 12.1-12.3 together with the resistors R serve as a 3-bit digital-to-analog converter. Each of the three comparators 12.1-12.3 has an individual output designated by b0, b1 and b2. These three output lines b0, b1, b2 are connected to a decoder unit 17, as depicted in FIG. 2B. This decoder unit 17 takes the 3-bit word received from the comparators 12.1-12.3 as an input signal and causes an oscillator 18 to change the switching frequency $f_{osc}$ at the output 19.

As discussed in connection with equation (1), increasing the switching frequency $f_{osc}$ will allow the effect of a reduced value of the external stage capacitors 13 on the gain of the charge pump to be compensated.

The counter & logic block 11 drives the two switches in FIG. 2A as well as the switch $S_{mess}$ in FIG. 2B. The switches $S_{load}$ and $S_{mess}$ in FIG. 2A together with the resistors R, the three comparators 12.1-12.3, and a current source 16 are the essential elements of the monitoring unit 20. The decoder 17 together with the oscillator 18 are herein referred to as means 30 for adjusting the switching frequency $f_{osc}$.

Figure 3:
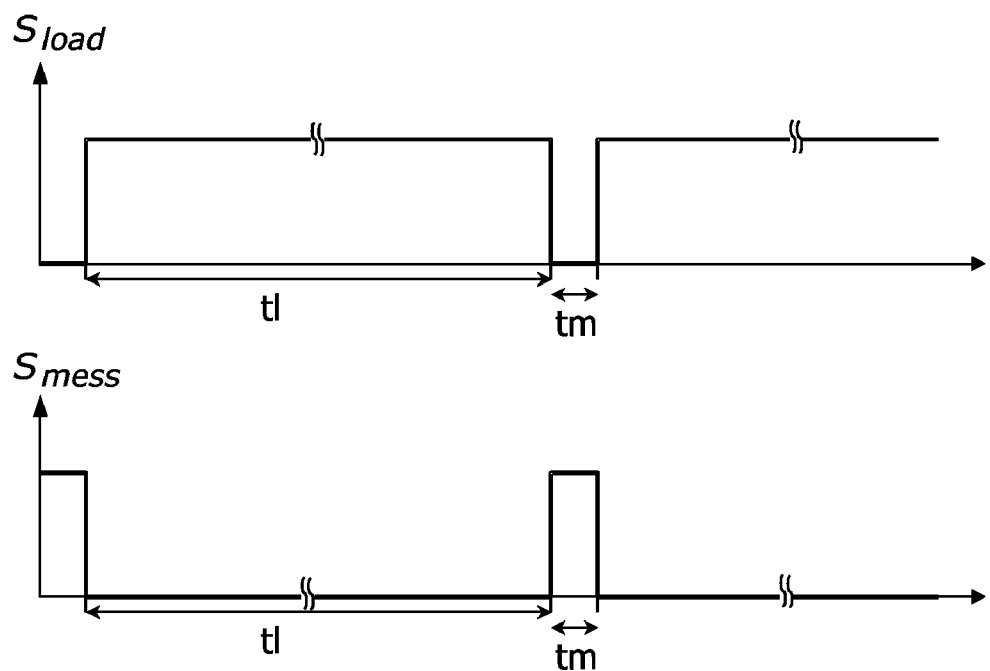
FIG. 3 shows a timing diagram illustrating an example of the loading mode and the measuring mode, according to the present invention.

Because temperature-induced effects on the stage voltages inside the multistage charge pump and the output voltage of charge pump are slow in most cases, the measuring of the value of the external reference capacitor $C_{ref}$ can be done after 10 s, for instance. As illustrated in FIG. 3, the monitoring circuit 20 may be switched from a loading mode to a measuring mode after t1, then it performs the measurement during a time-out period tm that lasts 10 s, for example. After the time-out period tm, the monitoring circuit 10 switches back to the loading mode. As can be seen in FIG. 3, the measuring mode is only a very small fraction of the loading mode.

While the monitoring circuit 20 is in the loading mode, the switch $S_{load}$ is closed and the switch $S_{mess}$ is open. Due to this specific setting of the switches, the external reference capacitor $C_{ref}$ is charged until the voltage $V_C$ across its nodes reaches the supply voltage $V_{dd}$. If one employs a high-ohmic p-type MOSFET transistor as switch $S_{load}$, it only takes a very small current of some µA for some ms to fully charge the external reference capacitor $C_{ref}$. Once the external reference capacitor $C_{ref}$ is fully charged, the voltage $V_C$ across its nodes is kept at $V_{dd}$ (provided that there is no load discharging it).

The monitoring circuit 20 is now switched to the measuring mode where the switch $S_{load}$ is open and the switch $S_{mess}$ is closed.

If the duration of the time-out period tm is fixed, then the maximum voltage drop $\Delta V_{mess}$ depends only on the current I provided by the current source 16 and the value of the external reference capacitor $C_{ref}$ caused by a temperature-induced change.

Figure 4A:
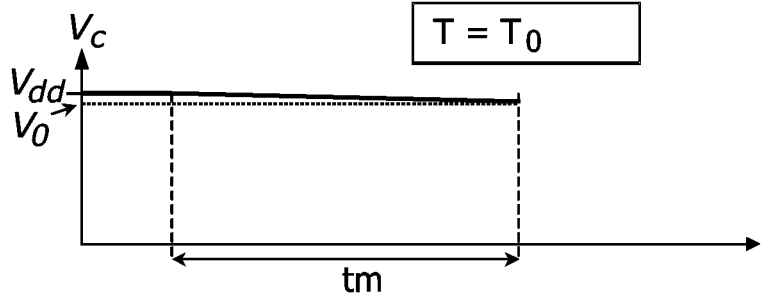
FIG. 4A shows a voltage versus time diagram illustrating the voltage across the external capacitor, according to the present invention, if the temperature T=T0 is kept constant.
Figure 4B:
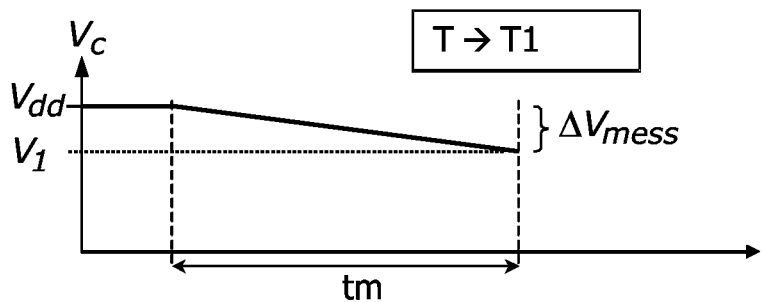
FIG. 4B shows a voltage versus time diagram illustrating the voltage across the external capacitor, according to the present invention, if the temperature T is reduced to T1.

Reference is made to FIG. 4A to FIG. 4D to illustrate this by means of actual examples. In FIG. 4A a situation is shown where the temperature T has a value T0. The temperature T0 causes a small change of the value of the external reference capacitor $C_{ref}$ and the voltage drop $\Delta V_{mess}$ is thus negligible. That is, the voltage $V_C$ is only slightly reduced to $V_0$, as depicted in FIG. 4A. In this case none of the comparators 12.1-12.3 is triggered and the 3-bit word at the output side is "000".

If the temperature T of the external reference capacitor $C_{ref}$ goes down to T1, the value of external reference capacitor $C_{ref}$ gets smaller and the voltage drop $\Delta V_{mess}$ gets noticeable. This in turn means that the voltage $V_C$ goes down to a voltage $V_1$. In this case the first comparator 12.1 is triggered and the 3-bit word at the output side is "100". The voltage $V_1$ is the threshold voltage of the first comparator 12.1.

Figure 4C:
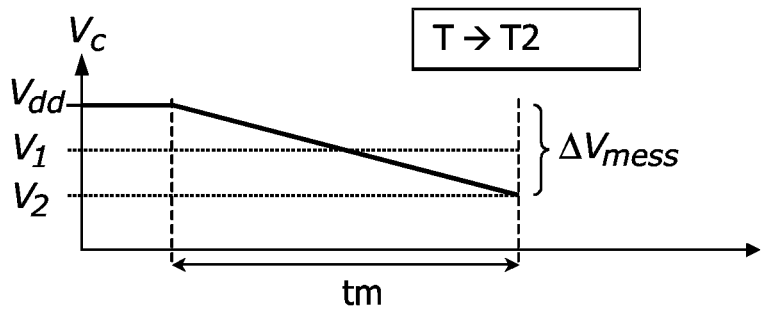
FIG. 4C shows a voltage versus time diagram illustrating the voltage across the external capacitor, according to the present invention, if the temperature T is reduced to T2.

Now, as the temperature is reduced even further (T reaches the temperature T2, with T2<T1), the value of external reference capacitor $C_{ref}$ continues to get smaller and the voltage drop $\Delta V_{mess}$ gets larger. This is depicted in FIG. 4C. In this case the first comparator 12.1 and the second comparator 12.2 are triggered and the 3-bit word at the output side is "110". The voltage $V_2$ is the threshold voltage of the second comparator 12.1.

Figure 4D:
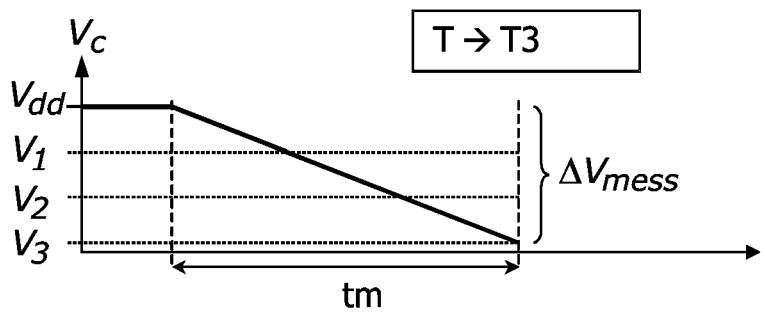
FIG. 4D shows a voltage versus time diagram illustrating the voltage across the external capacitor, according to the present invention, if the temperature T is reduced to T3.

In FIG. 4D an extreme situation is shown where the temperature T is very low (T reaches the temperature T3, with T3<T2<T1). The value of external reference capacitor $C_{ref}$ is now even smaller and the voltage drop $\Delta V_{mess}$ large. In this case all three comparators 12.1-12.3 are triggered and the 3-bit word at the output side is "111". The voltage $V_3$ is the threshold voltage of the third comparator 12.3.

The example in FIG. 4A through 4D exaggerates and oversimplifies the situation in order to be able to better describe the function of the monitoring circuit 20.

The 3-bit word at the output side of the monitoring circuit 20 is thus a representation of the actual voltage drop $\Delta V_{mess}$ at external reference capacitor $C_{ref}$.

According to the present invention this voltage drop $\Delta V_{mess}$ is compensated by adjusting the switching frequency $f_{osc}$. The means 30 for adjusting the switching frequency $f_{osc}$ comprise, as described above, a decoder 17 and an oscillator 18. The decoder 17 transforms the 3-bit word into a signal that is forwarded to the oscillator 18 if the switch $S_{mess}$ is closed. The oscillator 18 in the present embodiment can assume four different states. In the first state (1), the switching frequency $f_{osc}$ is the regular switching frequency of the charge pump. As the temperature-induced effects on the value of external reference capacitor $C_{ref}$ increase, the switching frequency $f_{osc}$ is also increased. The switching frequency $f_{osc}$ in the second state (2) is higher than in the first state (1), the switching frequency $f_{osc}$ in the third state (3) is higher than in the second state (2), and the switching frequency $f_{osc}$ in the fourth state (4) is higher than in the third state (3).

The different switching frequencies $f_{osc}$ in the various states (1) through (4) are preferably defined such that the second term in equation (1) remains constant even if the temperature T changes.

If the external stage capacitors C and the corresponding external reference capacitor $C_{ref}$ are high-quality capacitors that show only small deviations when the temperature changes, or if the charge pump presented herein is used in an environment where the temperature is either stable or where special measures are taken to keep the temperature stable, the monitoring circuit 20 will always issue a 3-bit word "000". In this case the charge pump would always be operated at the normal switching frequency $f_{osc}$ (state 1).

The oscillator 18 is realized such that it keeps the frequency that was programmed during the last measuring mode. If for instance the last measuring mode revealed that no temperature deviations have had an impact on the capacitor's value, then the oscillator 18 holds the current switching frequency $f_{osc}$ (state 1). Only if during the measuring mode a temperature deviation has been detected and hence the 3-bit word has changed, will the switching frequency $f_{osc}$ change.

In the embodiment present so far, a coarse grid was implemented with just three comparators 12.1-12.3. This may be sufficient for many applications. If only few comparators are employed, the static offsets of the comparators can be neglected and the mismatch errors of the resistor ladder does not have any disturbing impact. Also switching pikes caused by the switches $S_{load}$ and $S_{mess}$ are negligible.

The embodiment described so far can be modified as needed. It is for instance possible to employ more comparators to more closely monitor and detect changes of the voltage $V_C$ across the external reference capacitor $C_{ref}$.

The counter & logic block 11 can be realized in many different ways. It may comprise a hardware-implemented counter that counts up to a certain number and than issues the switching signal at the output 11.1 that switches the switches $S_{load}$ and $S_{mess}$. Logic means may be included in the counter & logic block 11 so that this block 11 can be activated by applying an enable signal, for instance. In a more sophisticated embodiment, the counter & logic block 11 is designed so that it can be programmed. This gives the customer the flexibility to define the time-out period tm. The counter & logic block 11 can for instance be described/designed using the known VHDL language.

It is an advantage of the monitoring circuit 20 presented herein that the current consumption of the high-ohmic resistor ladder and the comparators can be fixed at a very low point. This is possible since the comparators do not need to be designed to switch quickly. It is sufficient for them to react within the time-out period tm. The whole monitoring circuit 20 thus is a low power circuit.

In another embodiment of the present invention, the current source 16 is a programmable current source. This allows the monitoring circuit 20, according to the present invention, to be customized depending on the kind and size of the external reference capacitor $C_{ref}$ that is connected. This makes the monitoring circuit 20 more universal. The customer who uses the monitoring circuit 20 can then program the current source 16 after he has specified the capacitors that he intends to use.

One may also use an external reference capacitor $C_{ref}$ having a value that is smaller or larger than the value of the external stage capacitors C, as long as the following conditions are satisfied:

$C_{ref}=nC$, with n being an integer number, and the current I issued by the current source 16 in this case is I=nI; or $C_{ref}=C/k$, with k being an integer number, and the current I issued by the current source 16 in this case is $I=I/k$.

Figure 5:
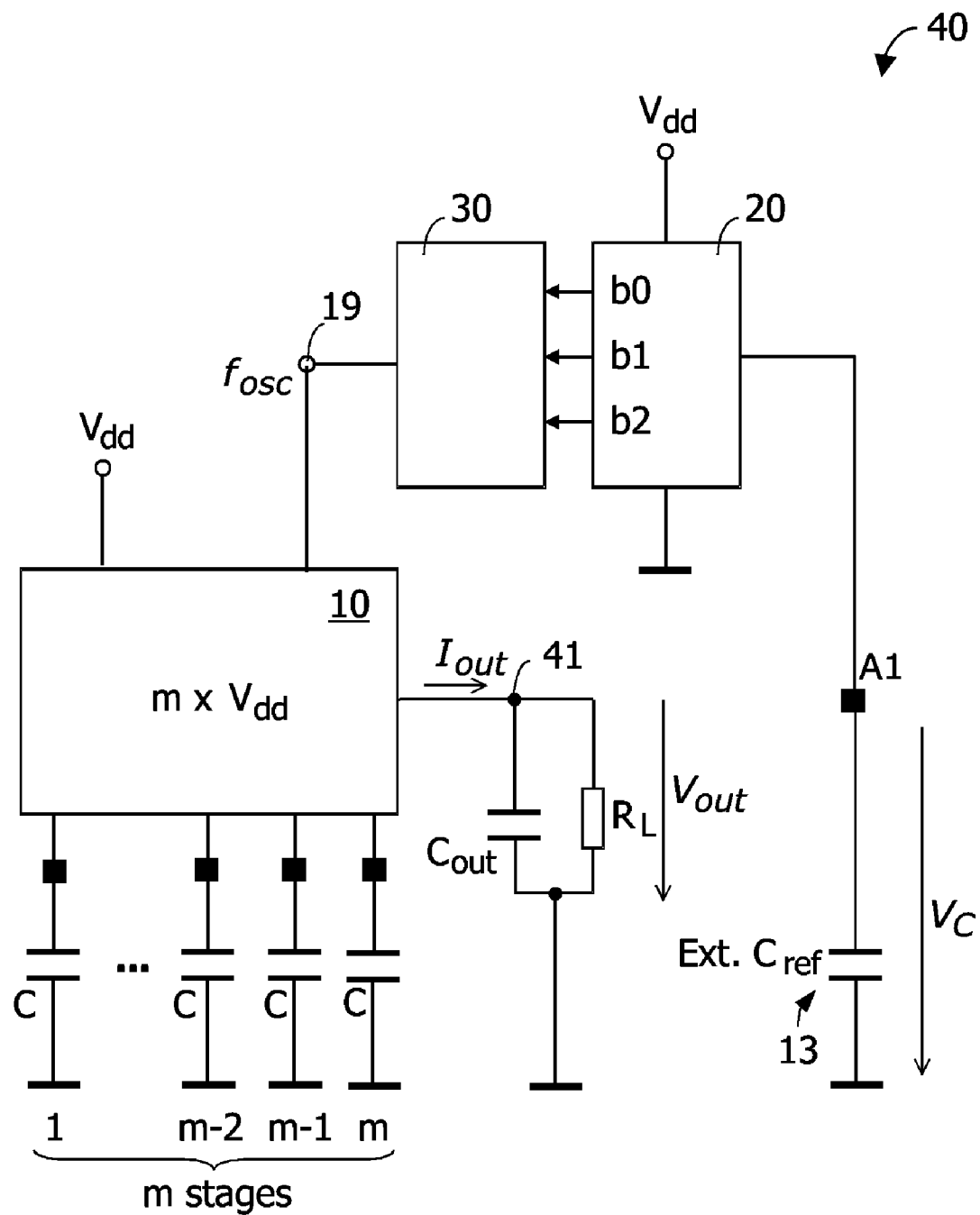
FIG. 5 shows a schematic block diagram of an apparatus of the present invention.

Yet another embodiment is depicted in FIG. 5. In this Figure an apparatus 40 is shown that comprises a multistage charge pump 10 having an output 41 for driving a load represented by $C_{out}$ and $R_L$. This output may for instance be connected to the high-voltage port of a display driver chip. The charge pump 10 comprises m gain stages with m stage capacitors C. The charge pump 10 provides an output voltage $V_{out}$ at the output 41 that is higher than the supply voltage $V_{dd}$ applied to the charge pump 10. The charging and discharging is influenced by switches (e.g. MOSFET switches) that are controlled by a switching signal having a switching frequency $f_{osc}$. A monitoring circuit 20 is employed for monitoring temperature-induced changes of the value of the external reference capacitor $C_{ref}$. There are means 30 for adjusting the switching frequency $f_{osc}$ in order to compensate variations of the gain of said charge pump 10 that are caused by the changes of the value of the external stage capacitors C. The influence of the voltage dependence of the external stage capacitors C compared to the external reference capacitor $C_{ref}$ is negligible for the precision of the monitoring circuit 20.

The present invention can be used in connection with all charge pumps that allow the gain to be influenced by an adjustment of the switching frequency. The invention is very well suited for use in combination or as an integral part of a Dickson-type charge pump.

A charge pump with a monitoring circuit and with means for adjusting the switching frequency are particularly well suited for employment in display drivers. According to the present invention means are provided that enable the monitoring of the temperature dependence of the external capacitors C connected to a charge pump. A corresponding monitoring procedure is carried out from time to time. Based on the result of this monitoring procedure a compensation of temperature-induced changes is performed. According to the present invention this is done by adjusting the switching frequency of the charge pump.

It is regarded to be an advantage of the present invention that with the new proposed architecture one does not need larger external capacitors, which would cost more than the smaller ones. Furthermore, one can save chip area because the internal drivers for the external stage capacitors C can be made smaller, adapted to the smaller stage capacitors C.

The charge pump according to the present invention has improved performance. Since fewer external capacitors are required, cost reductions are possible. The footprint (chip area) can also be reduced with the present invention, if compared with conventional charge pumps.

A new charge pump can been realized by monitoring the temperature dependence of the external capacitors and by adjusting the switching frequency to make up for the temperature-induced loss of gain.

It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable sub-combination.

In the drawings and specification there have been set forth preferred embodiments of the invention and, although specific terms are used, the description thus given uses terminology in a generic and descriptive sense only and not for purposes of limitation.

The invention claimed is:

1. Apparatus comprising:
a multistage charge pump having an output for connecting a load, said charge pump comprising m gain stages with m external stage capacitors, with m being an integer number larger than 1, for charging and discharging said external stage capacitors in order to provide an output voltage at said output which is approximately m times higher than a supply voltage of said charge pump, said charging and discharging being influenced by switches that are controlled by a switching signal having a switching frequency,
at least one external reference capacitor,
a monitoring circuit for monitoring temperature-induced changes of the value of said external reference capacitor, wherein the monitoring circuit comprises:
a current source,
first and second switches connected in series between a voltage source and said current source,
a counter connected to said first and second switches to control said first and second switches,
a plurality of resistors in a series configuration connected to said voltage source, and
a plurality of comparators, each of said comparators including a first input connected to said at least one external reference capacitor and to a node between said first and second switches and a second input connected between adjacent resistors of said plurality of resistors, said comparators being connected to output signals that represent said temperature-induced changes of the value of said external reference capacitor, and
means for adjusting said switching frequency in order to compensate variations of the gain of said charge pump that are caused by the changes of the value of said m external stage capacitors.

2. The apparatus of claim 1, wherein said counter from time to time switches said monitoring circuit to a measuring mode.

3. The apparatus of claim 2, wherein during said measuring mode the monitoring circuit monitors a voltage drop across said external reference capacitor and provides an output having several bits, whereby said output is dependent on said voltage drop.

4. The apparatus of claim 3, wherein said means for adjusting said switching frequency comprise a decoder and an adjustable oscillator, said decoder being designed to process said output and to generate a signal for causing said oscillator to adjust said switching frequency.

5. The apparatus of claim 1, wherein said current source is an adjustable or programmable current source.

6. The apparatus of claim 1, wherein said switches are MOSFET switches.

7. The apparatus of claim 1, wherein said charge pump comprises a plurality of diode-connected MOSFET transistors or MOSFET switches.

8. The apparatus of claim 7, wherein said charge pump is a Dickson-type charge pump or a charge pump based on the Dickson principle.

* * * * *